Feb. 15, 1938.    W. G. FOARD, JR    2,108,114
METHOD OF HOODING, FILLING, AND CAPPING MILK BOTTLES
Filed June 11, 1936
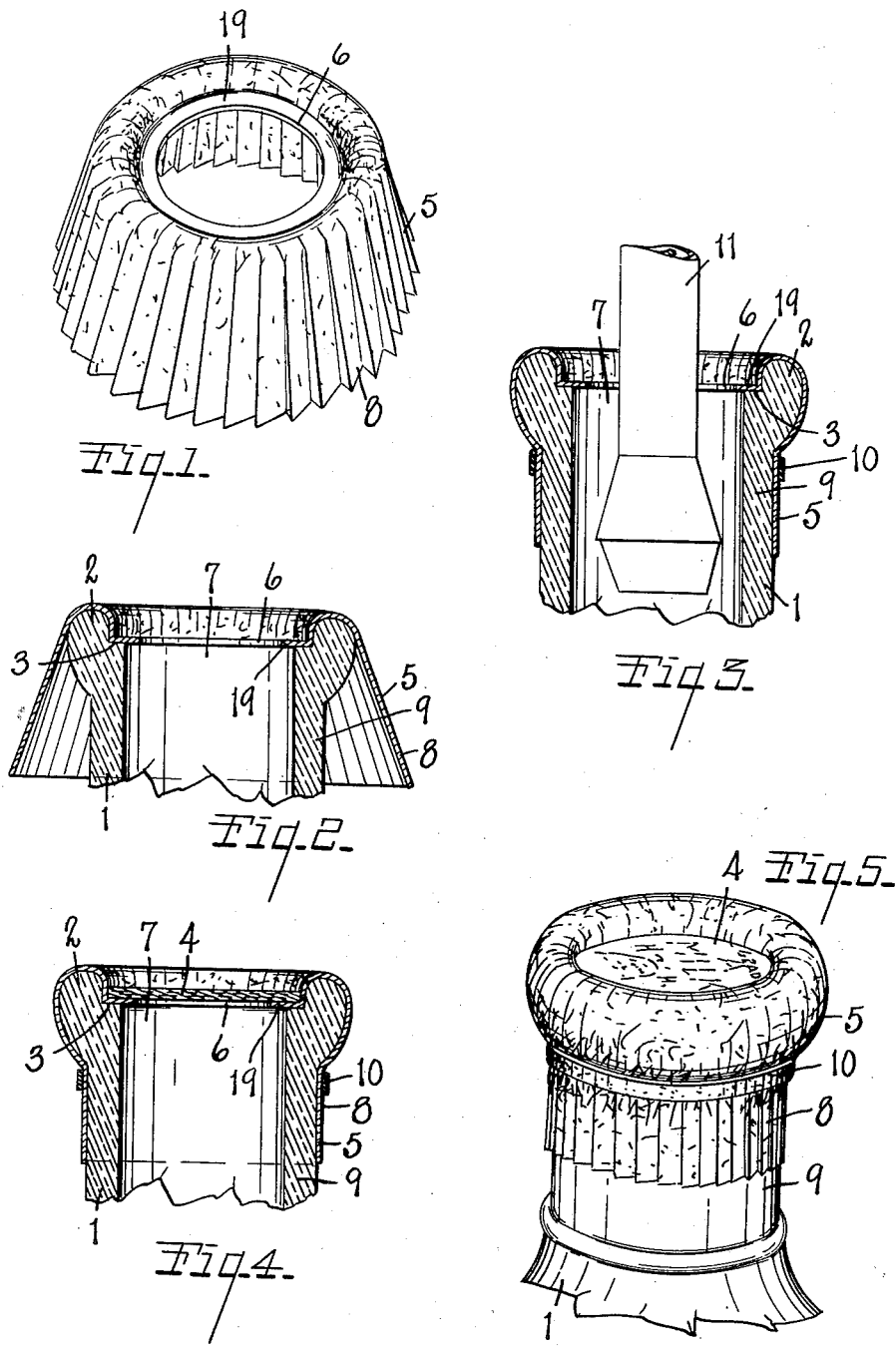
INVENTOR.
William G. Foard, Jr.
BY Chappell Earl & Chappell
ATTORNEYS.

Patented Feb. 15, 1938

2,108,114

UNITED STATES PATENT OFFICE 2,108,114

METHOD OF HOODING, FILLING, AND CAPPING MILK BOTTLES

William G. Foard, Jr., Kalamazoo, Mich.

Application June 11, 1936, Serial No. 84,725

2 Claims. (Cl. 226—73)

This application is a continuation in part of my application Serial No. 14,051, filed April 1, 1935, for closures for milk bottles.

The invention relates to a method of filling, hooding and capping milk bottles to eliminate contamination of the product. Heretofore, in filling, capping and hooding milk bottles, it has been the practice to fill the bottle with automatic filling machinery, then cap the bottle and then apply a hood thereto. This method has been very unsatisfactory because it is practically impossible to fill milk bottles on a commercial scale without some milk splashing or dripping onto the edge over which the milk is to be poured by the consumer. Leaving milk on the lip of the bottle is very unsanitary because when the bottle is allowed to stand, the milk sours and not only soils the lip of the bottle, but also forms a breeding place for bacteria and when milk is poured from the bottle by the consumer it is poured over the soiled contaminated lips which leads to contamination of the milk.

In the average dairy after milk bottles are capped and before applying the hood, employees are prone to grasp the bottle by the top, transferring it to the hooding apparatus. This soils the pouring lip further and is objectionable and proscribed by sanitary codes. Although applying a hood after a bottle is filled and capped has some advantage in that street dirt and flies are kept from the pouring lip of the bottle after it leaves the creamery, it still is subject to disadvantages as above set forth. In addition the apparatus for hooding involves considerable investment and is expensive to operate.

The objects of this invention are:

First, to provide a method of hooding, filling and capping milk bottles which will eliminate these objections.

Second, to provide such a method in which the neck of the bottle is protected from the time it passes from the sterilizer until the hood and cap are removed for pouring.

Third, to provide such a method which protects the pouring lip of the bottle from contamination and soiling and which may be carried out simply and easily with the use of no equipment other than would be necessary in a dairy and with the use of very inexpensive hoods.

Fourth, to provide a hood made of paper or the like for application to the neck of milk bottles which hood is so formed that it may be put in place on the bottle, clamped in place about the neck, and held there for filling without deforming the remainder of the hood and while leaving it in position to be clamped by the insertion of the cap.

Other objects and advantages pertaining to details and economies of construction and operation will appear from the description to follow. Preferred embodiments of my invention are illustrated in the accompanying drawing, in which:

Fig. 1 is a perspective view of my improved hood for milk bottle to be used in conjunction with my method.

Fig. 2 is a sectional view of the neck of a milk bottle showing a cap placed loosely in position on a bottle prior to filling.

Fig. 3 is a sectional view showing the cap held in place by a rubber band during the filling operation.

Fig. 4 is a sectional view showing the completely hooded and capped bottle.

Fig. 5 is a perspective view showing the finished filled, hooded and capped bottle.

My invention has specific application to the use of the ordinary type of milk bottle 1 having rounded pouring lips 2 and an internal annular shoulder 3 for seating a disk cap 4, which is of the usual pasteboard or paperboard construction and is ordinarily impregnated with paraffin.

In carrying out my invention I employ a hood 5. I have found that the most satisfactory material for use as a hood is a waterproof vegetable parchment sheet of a weight from about 30 to 60 pounds. By this I mean that a ream of the paper or parchment consisting of 500 sheets 24" x 36" weighs the number of pounds indicated. Although I prefer to use the vegetable parchment referred to, it will be appreciated that other sheet protective materials could be employed and that suitably prepared paper or regenerated cellulose products other than parchment, such as "Cellophane" could be employed.

The hood 5 is an annular member provided with a central aperture 6. In the preferred form of the construction the aperture 6 is of a size somewhat smaller than the opening 7 in the neck of the bottle. A downwardly extending skirt 8 is formed on the hood by means of a crimping die and this skirt extends from the outer edge of the lip 2 of the bottle downwardly over the neck portion 9 of the bottle when the hood is in position. At the center of the annular hood 5 and adjacent the edge of the aperture 6, I provide a portion for engaging inside of the lips 2 of the bottle. This is formed by a punch die which forms the paper or parchment to the form shown. The punched down portion designated at 19 fits within the lips 2 of the bottle and rests loosely therein when the hood is put in position on the bottle. As the bottle passes from the sterilizer, the hood is placed on the bottle as shown in Fig. 2, and a rubber band or other suitable fastening means 10 is placed in position around the hood to hold it in position during the filling operation, pulling the skirt 8 of the hood in against the neck 9 of the bottle and holding the hood so that the filling tube 11 of the bottle filling apparatus will not on withdrawal from the bottle remove the hood 5.

I have found that when the skirt 8 of the hood is brought up against the neck 9 of the bottle, there is a tendency for the hood to become deformed at the lips of the bottle, and I have found that by using a punch die to form the depression 19 in the hood, it is possible to overcome this tendency so that the hood 5 will remain in position protecting the upper lips of the bottle for the filling operation to follow.

After the hood is in position, as shown in Fig. 3, the filling tube 11 is inserted in the mouth of the bottle and the bottle is filled. Thereafter the tube 11 is withdrawn and it is at this point that milk is apt to drip from the tube onto the lips of the bottle. By having the lips fully protected by hood 5, any milk which is spilled is spilled on the hood 5 and although bacteria may breed in such soured milk, it will be apparent that the removal of the hood 5 and the cap 4 will leave the lips in the same clean, sterilized condition as they were when the bottle passed from the sterilizer.

After the filling operation and the withdrawal of the tube 11, the bottle passes to the capper where the pasteboard cap 4 is inserted. The cap 4, being inserted in the depression 19, firmly clamps the upper portion of the hood over the lips and the hood remains thus in position until the consumer removes the cap and the hood for pouring milk from the bottle.

Having thus described my invention, what I claim as new and desire to secure by Letters Patent is:

1. The method of hooding, filling and capping milk bottles having pouring lips and a cap seating shoulder comprising protecting said pouring lips and cap seating shoulder by placing on the bottle and over the pouring lips and cap seating shoulder thereof before filling the bottle a hood of paper or the like having a central aperture of a size smaller than the opening of the bottle, locating said aperture centrally of the opening of the bottle, fastening said hood in place on the bottle, filling the bottle, and then clamping the hood in place over the pouring lips and cap seating shoulder of the bottle, and sealing the bottle by inserting a disk cover into the neck of the bottle over the aperture in the hood and on the cap seating shoulder of the bottle.

2. The method of hooding, filling and capping milk bottles having pouring lips and a cap seating shoulder comprising protecting said pouring lips and cap seating shoulder by placing on the bottle and over the pouring lips and cap seating shoulder thereof before filling the bottle a formed hood of paper or the like having a central aperture of a size smaller than the opening of the bottle, locating said aperture centrally of the opening of the bottle, filling the bottle, and then clamping the hood in place over the pouring lips and cap seating shoulder of the bottle, and sealing the bottle by inserting a disk cover into the neck of the bottle over the aperture in the hood and on the cap seating shoulder of the bottle.

WILLIAM G. FOARD, Jr.